(12) United States Patent
Forde et al.

(10) Patent No.: US 8,054,292 B1
(45) Date of Patent: Nov. 8, 2011

(54) MOUSE HAVING AN EXCHANGEABLE PALM REST

(75) Inventors: Kevin Forde, Cork (IE); Fergal Corcoran, County Cork (IE)

(73) Assignee: Logitech Europe S.A., Morges (CH)

( * ) Notice: Subject to any disclaimer, the term of this patent is extended or adjusted under 35 U.S.C. 154(b) by 795 days.

(21) Appl. No.: 11/354,613

(22) Filed: Feb. 14, 2006

(51) Int. Cl.
  *G06F 3/033* (2006.01)
  *G09G 5/08* (2006.01)

(52) U.S. Cl. ........................................................ 345/163

(58) Field of Classification Search ........... 345/156–175
See application file for complete search history.

(56) References Cited

U.S. PATENT DOCUMENTS

| | | | |
|---|---|---|---|
| 4,628,755 A | 12/1986 | Hawley | |
| 5,076,584 A | 12/1991 | Openiano | |
| 5,260,696 A * | 11/1993 | Maynard, Jr. | 345/163 |
| 5,581,277 A | 12/1996 | Tajiri | |
| 5,828,364 A | 10/1998 | Siddiqui | |
| 5,847,696 A * | 12/1998 | Itoh et al. | 345/163 |
| 6,016,138 A | 1/2000 | Harskamp et al. | |
| 6,118,431 A | 9/2000 | Terrier et al. | |
| 6,154,196 A | 11/2000 | Fleck et al. | |
| 6,195,085 B1 | 2/2001 | Becker et al. | |
| 6,229,527 B1 | 5/2001 | Sheam | |
| 6,411,281 B1 | 6/2002 | Sasselli et al. | |
| 6,489,947 B2 * | 12/2002 | Hesley et al. | 345/163 |
| 6,567,073 B1 | 5/2003 | Levin | |
| 6,590,563 B1 * | 7/2003 | Oross et al. | 345/163 |
| 6,616,108 B1 * | 9/2003 | Brophy et al. | 248/118.1 |
| 6,690,359 B1 * | 2/2004 | Felton | 345/163 |
| 6,704,003 B2 | 3/2004 | Tiphane et al. | |
| 6,859,196 B2 | 2/2005 | Kehlstadt | |
| 7,009,597 B1 * | 3/2006 | Ames | 345/163 |
| 2003/0160765 A1 | 8/2003 | Gordon | |
| 2003/0197684 A1 * | 10/2003 | Smith et al. | 345/163 |
| 2004/0061681 A1 * | 4/2004 | Shen et al. | 345/163 |
| 2006/0202960 A1 | 9/2006 | Chang | |
| 2007/0159461 A1 * | 7/2007 | Zhou | 345/163 |
| 2008/0143670 A1 | 6/2008 | Vayda | |

OTHER PUBLICATIONS

Final Office Action for U.S. Appl. No. 11/413,971 mailed on Oct. 26, 2009; 12 pages.
U.S. Appl. No. 11/413,971, filed Apr. 28, 2006, Charlton et al.
Non-Final Office Action for U.S. Appl. No. 11/413,971 mailed on Mar. 5, 2009; 10 pages.

* cited by examiner

*Primary Examiner* — Richard Hjerpe
*Assistant Examiner* — Carolyn R Edwards
(74) *Attorney, Agent, or Firm* — Kilpatrick Townsend & Stockton LLP

(57) ABSTRACT

A mouse having an adjustable body size includes a mouse body having a first side and a second side; and a palm rest coupled to the mouse body, wherein the palm rest has a first size and the palm rest is configured to be removed from the mouse body to fit another palm rest to the mouse body having a second size that is different from the first size. The palm rest includes a first arm, a second arm, and a body portion that couples the first arm and the second arm. The first arm and the second arm are respectively coupled to the first side and second side of the mouse body.

20 Claims, 6 Drawing Sheets

MOUSE HAVING AN EXCHANGEABLE PALM REST

BACKGROUND OF THE INVENTION

The present invention generally relates to an input device, such as a mouse, and more particularly relates to a mouse that includes an exchangeable palm rest for adjusting the size of the mouse.

Input devices for computers and the like typically include mice, keyboards, joysticks, touch pads and the like for computer control. These input devices are typically used to control computer applications that typically include graphical objects that may be manipulated by the input device. Typical input devices often include one or more buttons and a roller for computer control. Mice often do not comfortably fit a user's hand size as the mice do not have adjustable body sizes. For example, may designers make mice to fit men's hands but fail to make mice that fit women and children's hands.

Examples of mice having adjustable body elements include: Logitech Europe S.A. U.S. Pat. No. 6,704,003, Felton U.S. Pat. No. 6,690,359, Sharp Laboratories U.S. Pat. No. 6,567,073, Shearn U.S. Pat. No. 6,229,527, IBM U.S. Pat. No. 6,195,085, Wacom U.S. Pat. No. 6,154,196, France Telecom U.S. Pat. No. 6,118,431, and Harskamp U.S. Pat. No. 6,016,138.

The mouse industry continues to strive to develop new mouse devices that are adjustable to comfortably fit a user's hand.

BRIEF SUMMARY OF THE INVENTION

The present invention generally provides an input device, such as a mouse, and more particularly provides a mouse that includes a dead front display.

According to one embodiment, the mouse includes a mouse body having a first side and a second side; and a palm rest coupled to the sides of the mouse body. The palm rest has a first size and the palm rest is configured to be removed from the mouse body to fit another palm rest to the mouse body having. The size of the other palm rest has a second size that is different from the first size. The palm rest includes a first arm, a second arm, and a body portion that couples the first arm and the second arm. The first arm and the second arm are respectively coupled to the first side and the second side of the mouse body. According to a specific embodiment, the mouse body has a different width, a different length, and/or a different height from the other mouse body. The palm rest is configured to be pivoted to raise and lower the body portion of the palm rest. The mouse body includes a back side between the first and second sides, and the body portion of the palm rest is coupled to back side of the mouse body. The body portion of the palm rest is coupled to the back side by a retractable attachment device. The mouse body includes a front side that is oppositely disposed with respect to the back side and includes a least one control button and a scroll wheel that are disposed substantially on the front side of the mouse body. The first and second arms respectively include first and second pins, the first and second sides respectively include first and second pin cavities, and the first and second pin cavities are removably coupled to the first and second pins to removably couple the palm rest to the mouse body. The first and second pins are configured to slide from the first and second cavities to decouple the palm rest from the mouse body.

The palm rest is coupled to the mouse body such that a gap is formed between the palm rest and the mouse body and the gap is configured as a vent. The mouse body may include a fan device configured to circulate air in the gap. The mouse body may also include a weight disk removably coupled to a bottom surface of the mouse body, wherein the weight disk is configured to include a set of removable weights to adjust the balance and/or weight of the mouse.

According to another embodiment of the invention, the mouse includes a mouse body having a first side and a second side, wherein a first plurality of indents are formed in the first side and a second plurality of indents are formed in the second side; and a palm rest coupled to the mouse body. The palm rest has a first size and is configured to be removed from the mouse body to fit another palm rest to the mouse body having a second size that is different from the first size. The palm rest includes a first arm, a second arm, and a body portion that couples the first arm and the second arm. The first arm includes a first pin device formed thereon, and the second arm includes a second pin device formed thereon. The first arm and the second arm are respectively coupled to the first side and second side of the mouse body. The first pin and the second pin are respectively configured to be positioned in the first plurality of indents and the second plurality of indent to tilt the body portion of the palm rest up or down. The mouse body has a different width, a different length, and/or a different height from the width, the length, and/or the height of the other mouse body.

A better understanding of the nature and advantages of the present invention may be gained with reference to the following detailed description and the accompanying drawings.

DETAILED DESCRIPTION OF EXEMPLARY EMBODIMENTS

Figure 1A:
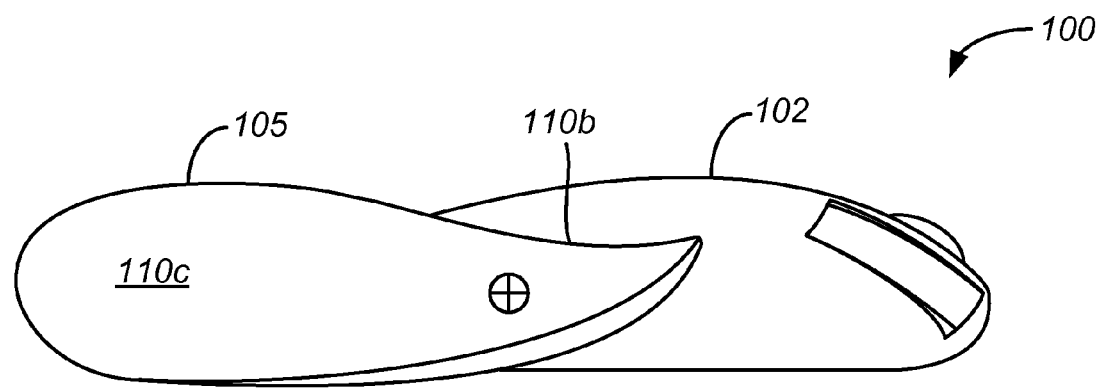
FIGS. 1A and 1B are simplified side and top views of a mouse having a mouse body and an exchangeable palm rest according to one embodiment of the present invention.
Figure 1B:
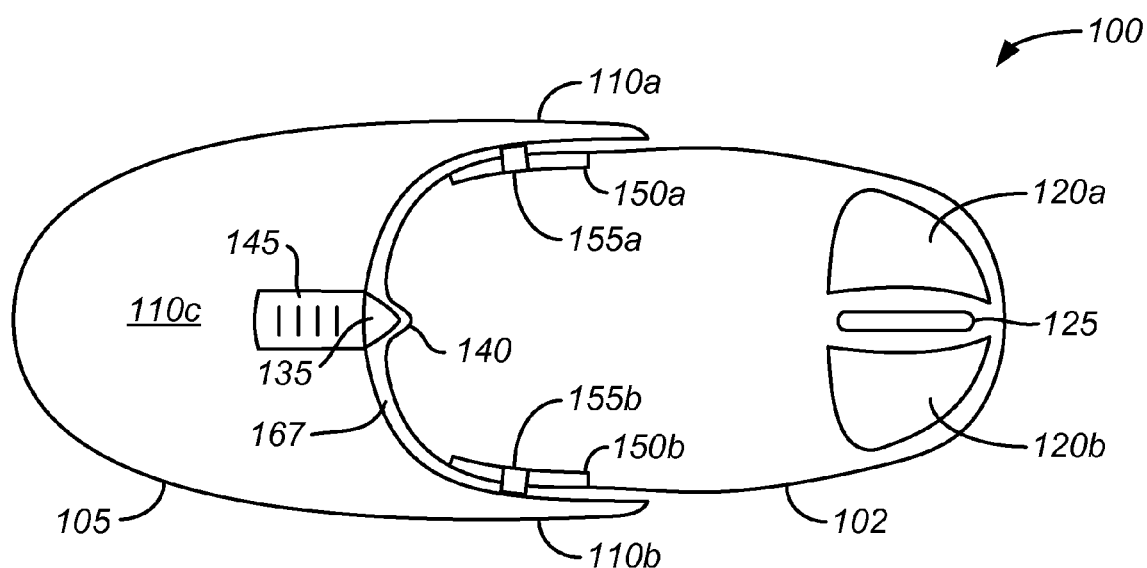

FIGS. 1A and 1B are simplified side and top views of a mouse 100 having a mouse body 102 and an exchangeable palm rest 105 according to one embodiment of the present invention. Palm rest 105 generally has a u-shape with two arms 110a and 110b that extend from a body portion 110c of the palm rests. Arms 110a and 110b are configured to generally extend along the sides of the mouse body, which may have a generally curved shape. Arms 110a and 110b form a portion of the sides of mouse 100. Body portion 110c generally extends along a back portion of the mouse body and forms a back portion of mouse 100. Various size palm rests 105 may be coupled to the mouse body to adjust the width, height, and/or length of the mouse. It should be understood the while element 105 is referred to as a palm rest, the palm rest may have a relatively short body portion 110c such that the palm rest does not extend under a palm portion of a user's hand, but may only extend under the user's fingers. It should also be understood that the palm rest may be substantially long such that the palm rest may also extend beyond the user's palm.

According to one embodiment of the present invention, mouse body 102 includes first and second control buttons 120a and 120b and a roller wheel 125 disposed on a front portion of the mouse body. The control buttons may be configured to perform traditional control button functions on a computer controlled by the mouse, such as making a selection on the computer's monitor and/or launching a drop down menu. A selection may include a selection of a portion of text from a document or the like. Document as referred to herein may include a text document, a table, a graphic image, computer code, a web page, or the like. The scroll button may be configured to scroll the document on the monitor, enlarge or reduce the document or the like. Such functions are well known to those of skill in the art and will not be described in further detail herein.

Figure 2A:
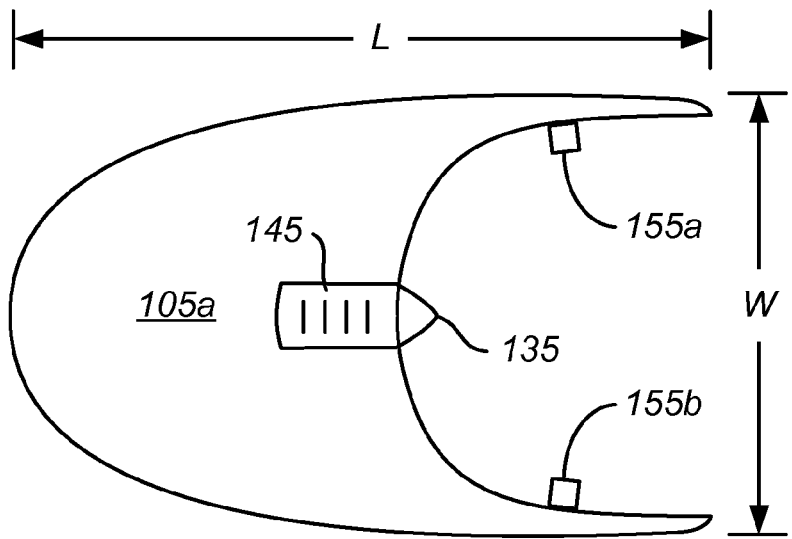
FIGS. 2A-2C are simplified top views of exemplary palm rests having various sizes.
Figure 2B:
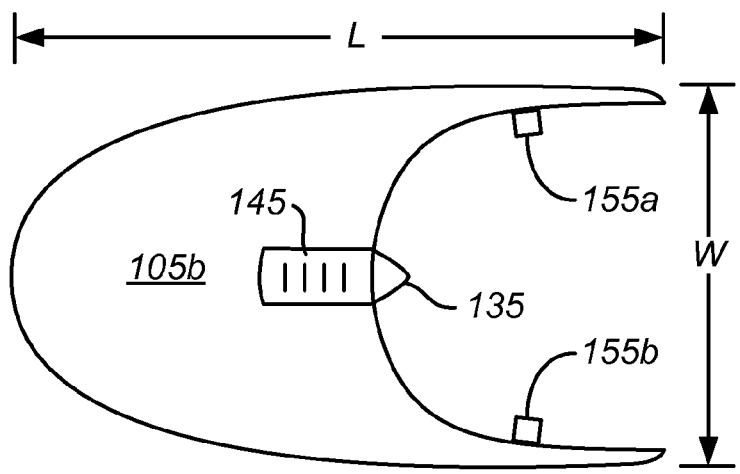
Figure 2C:
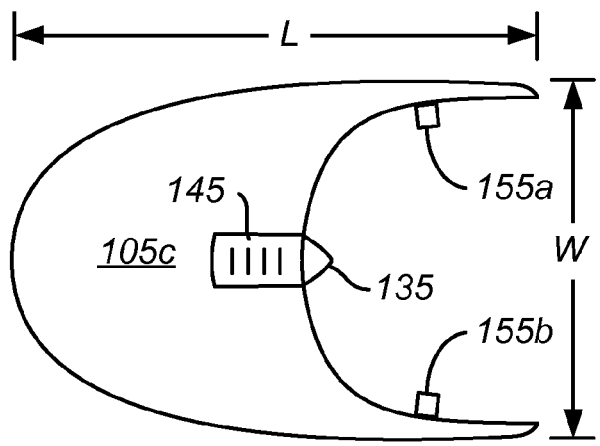

FIGS. 2A-2C are simplified top views of exemplary palm rests 105a-105c, respectively. Palm rests 105a-105c have various sizes. For example, palm rest 105a has a relatively larger width "w" than palm rests 105b and 105c, and palm rest 105b has a relatively larger width than palm rest 105c. Palm rest 105a also has a relatively longer length "1" than palm rests 105b and 105c, and palm rest 105b has a relatively longer length than palm rest 105c.

Figure 3A:
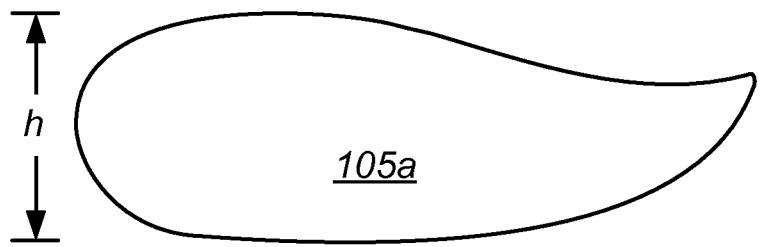
FIGS. 3A-3C are simplified side views of the palm rests shown respectively in FIG. 2A-2C.
Figure 3B:
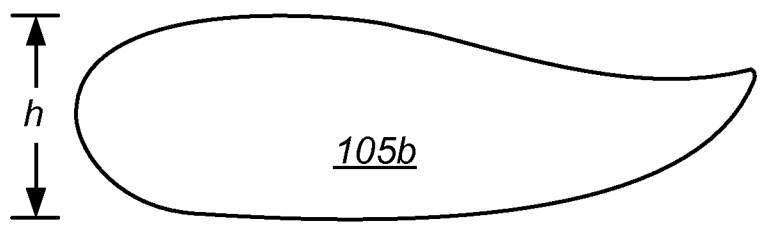
Figure 3C:
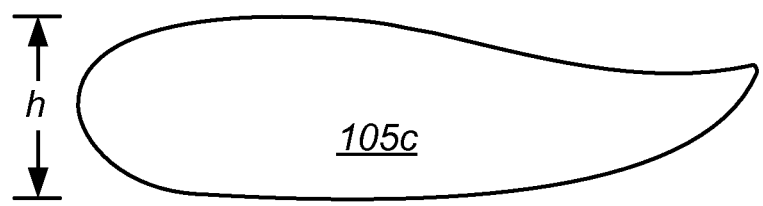

FIGS. 3A-3C are simplified side views of palm rests 105a-105c, respectively. Palm rests 105a-105b have various heights "h". For example, palm rest 105a has a relatively larger height than palm rests 105b and 105c, and palm rests 105b has a relatively larger height than palm rest 105c. It should be understood that the height, widths, and lengths of palm rests 105a-105c are exemplary and that palm rests according to embodiments of the present invention may have a variety of heights, widths, and lengths.

Referring again to FIGS. 2A-2C, each palm rests includes a clip 135 on a front portion of the palm rest's body portion. The clip might include a pin, a spring or the like that is configured to couple to an indented portion 140 of the mouse body. Each palm rest may include a retraction device 145 or the like that is configured to retract clip 135 from indent 145.

According to one embodiment, mouse 100 includes first and second pin cavities 150a and 150b that are disposed on opposite side of mouse body 102. Each palm rest includes first and second pins 155a and 155b respectively disposed on inside portions of arms 110a and 110b. Pin cavities 150a and 150b are configured to respectively receive pins 155a and 155b to removably attach the palm rest to the mouse body.

Figure 4:
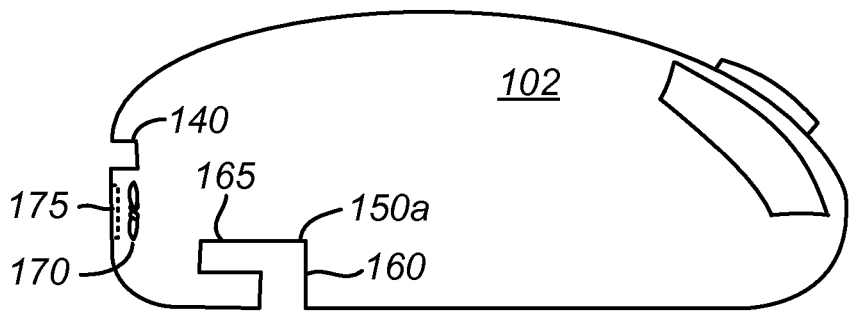
FIG. 4 is an enlarged view of a pin cavity formed in the mouse body according to one embodiment of the present invention.

FIG. 4 is an enlarged view of pin cavity 150a according to one embodiment of the present invention. The pin cavity includes a first slotted portion 160 configured to receive pin 155a to attach the palm rest to the mouse body. The pin cavity includes a second slotted portion 165 in which the pin 155a is configured to slide "back" to couple the palm rest to the mouse body as the palm rest is rotated to fit clip 135 into indent 140. Pin cavity 150b is configured similarly to pin cavity 150a on the opposite side of the mouse body and is configured to receive pin 155b.

According to one embodiment of the present invention, the palm rest is configured such that a vent region 167 is formed between the palm rest and the mouse body. The vent may extend from the bottom of the mouse to the top of the mouse. According to one embodiment, the mouse body includes a fan 170 (see FIG. 4) that is configured to blow air from a vent 175, through gap 167, and up to a user's hand. The fan may be configured to dry perspiration that forms on the user hand as the user uses the mouse.

Figure 5A:
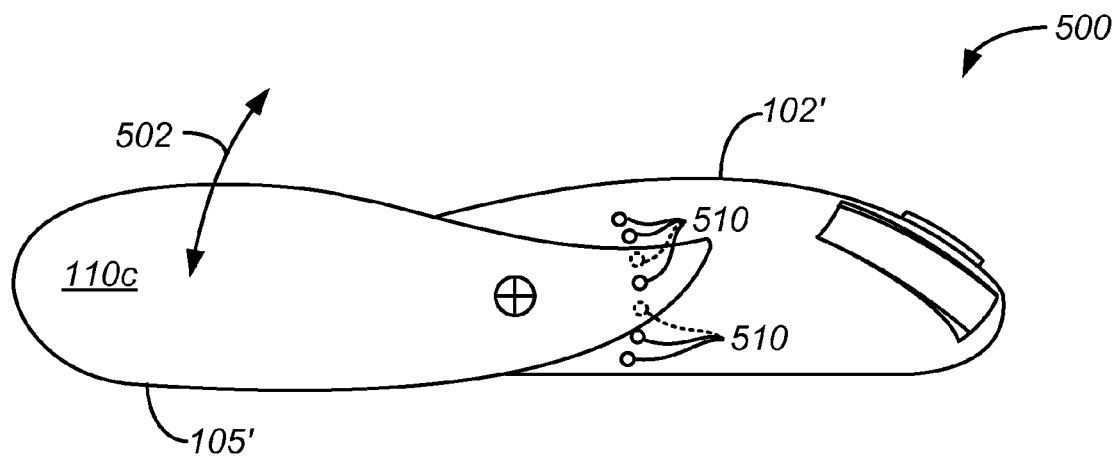
FIGS. 5A and 5B are simplified top and side views of a mouse according to another embodiment of the present invention.
Figure 5B:
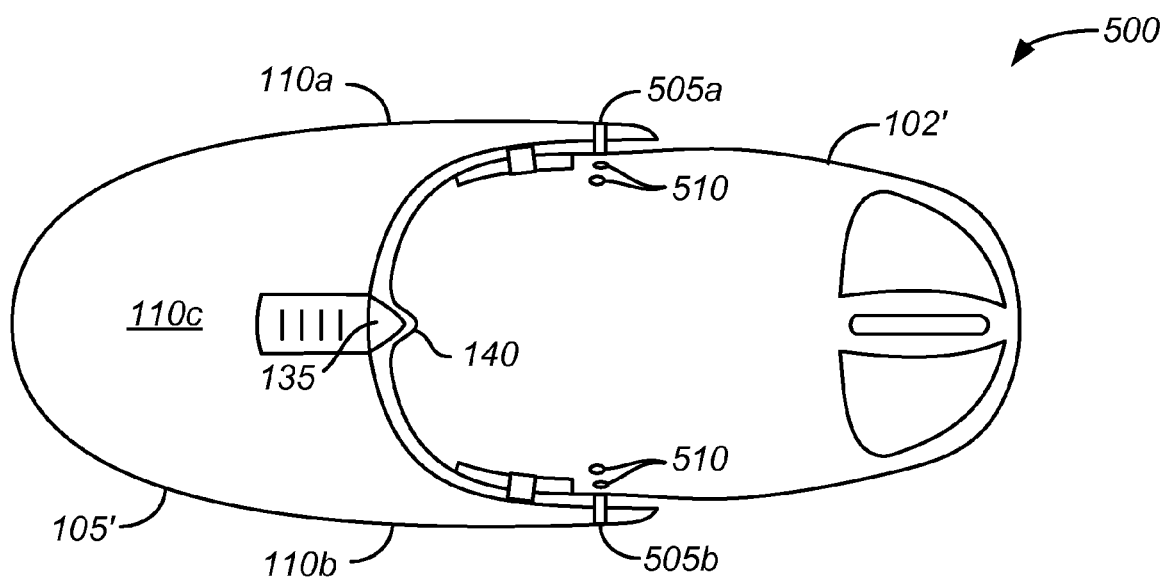

FIGS. 5A and 5B are simplified top and side views of a mouse 500 according to another embodiment of the present invention. Mouse 500 is similar to mouse 100 in that mouse 500 includes a mouse body 102' and a palm rest 105', which are similar to mouse body 102 and palm rest 105 described above. Mouse 500 differs from mouse 100 in that the palm rest 105' is configured to be tilted up or down (indicated by arrow 502) to raise or lower the body portion 110c of the palm rest. Specifically, palm rest 105' includes first and second button devices 505a and 505b disposed respectively on the left and right arms 110a and 110b of the palm rest. The button devices are configured to be positioned in various indents 510 formed on the sides of mouse body 102' to hold the palm rest in various tilted positions. The back of mouse body 102' might also include a number of indents, such as indent 140, that are configured to receive clip 135 to hold the palm rest in the various tilted positions.

Figure 6A:
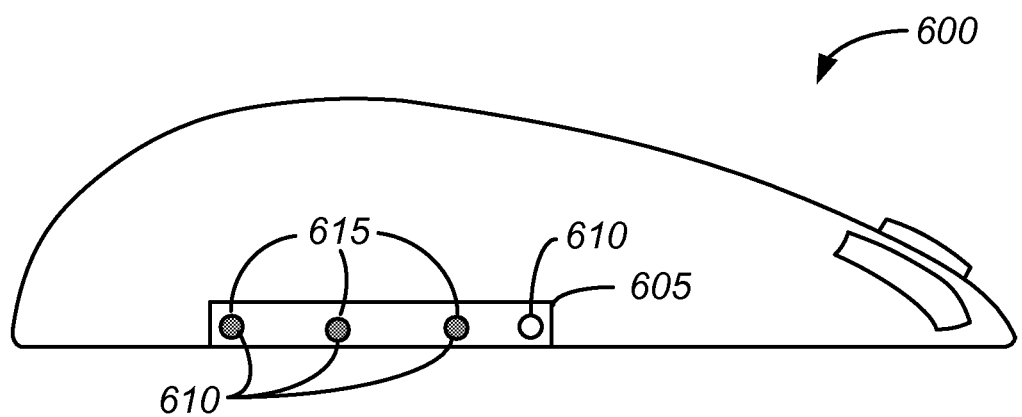
FIGS. 6A and 6B are bottom and side views of a mouse having a weight disk according to another embodiment of the present invention.
Figure 6B:
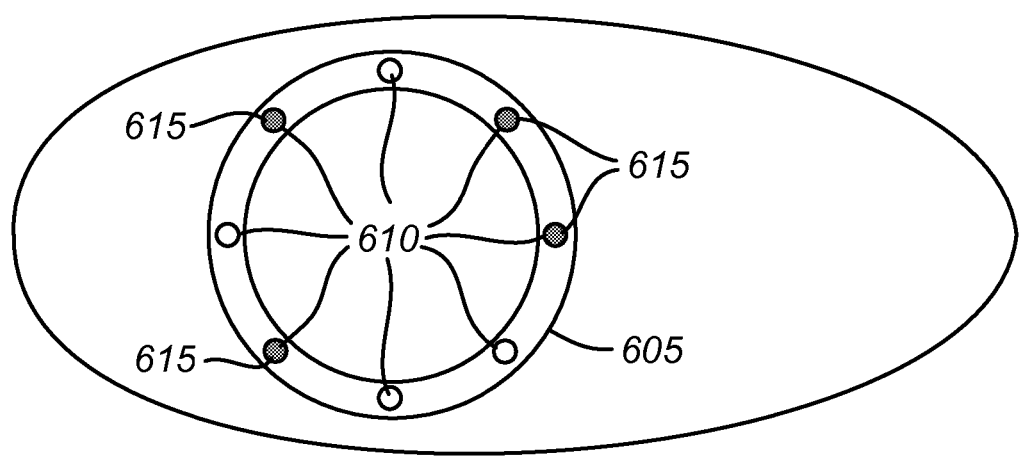

FIGS. 6A and 6B are bottom and side views of a mouse 600 according to one embodiment of the present invention. Mouse 600 includes a weight disk 605 that may be removably attached to the bottom of the mouse. The weight disk includes a set of weight cavities 610 formed therein. The weight cavities are configured to receive a set of weights 615. As shown in FIG. 6B, the four of the weight cavities are filled with weights 615, and four of the weight cavities are not filled with weights. The user of mouse 600 may fill the weight cavities with weights to adjust the weight and the weight balance of the mouse. While the weight cavities and weights are shown as generally round, the weight cavities and weights may have a variety of shapes, such as arced or the like. According to one embodiment of the present invention, mouse body 102 includes a weight disk 605 that may be variously filled with weights 615.

Figure 7A:
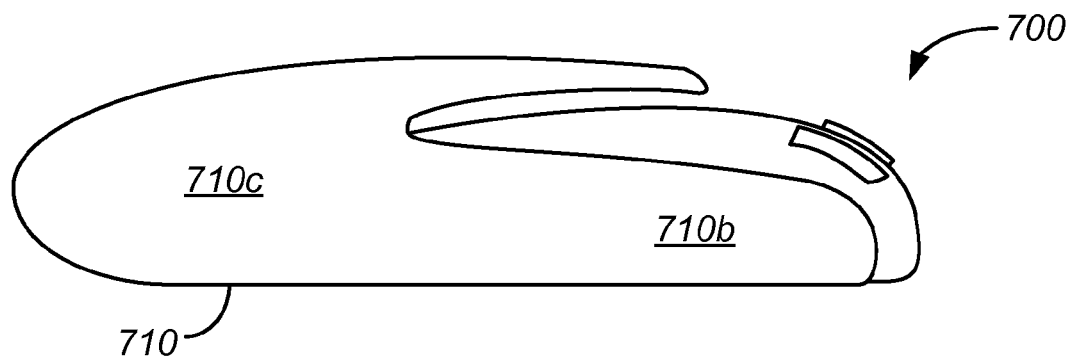
FIGS. 7A and 7B are side and top views of a mouse according to another embodiment of the present invention.
Figure 7B:
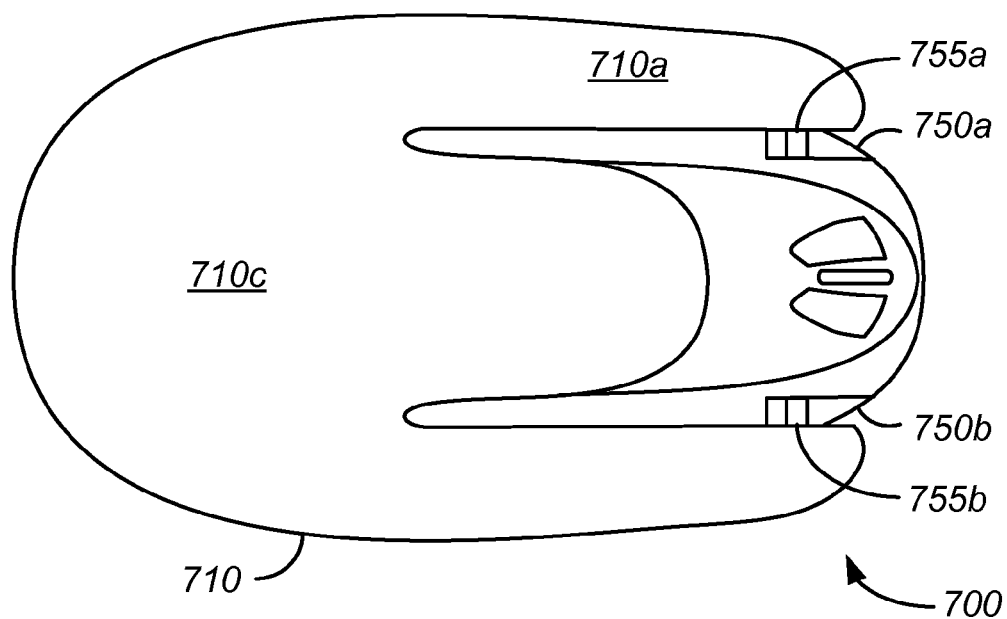

FIGS. 7A and 7B are side and top views of a mouse 700 and of the mouse's associated body portion 705. Mouse 700 differs from various mice embodiments described above in that mouse 700 includes a palm rest 710 that includes a palm rest portion 110c that extends over the top of the body and includes arms 710a and 710b that extend farther toward the front of the mouse. The arms may include first and second pins 755a and 755b respectively disposed on inside portions of arms 710a and 710b, and that are configured to fit into pin cavities 750a and 750b that are at the front of the mouse body. Similar to mice embodiments described above, mouse 700 include a clip (not shown) that is configured to couple to an indented portion of the mouse body. Similar to mouse embodiments described above, palm rest 710 may have a variety of widths and lengths.

According to one embodiment, one or more palm rests include a dead front display for displaying information to a user. A dead front display is configured to display lighted information through the palm rest, but the information is configured not to be visible if the information is not lighted. For a detailed explanation of dead front displays see U.S. patent Ser. No. 11/356,386, titled Dead Front Mouse, filed Feb. 15, 2006, of David Shaft et al., which is incorporated by reference herein in its entirety.

It is to be understood that the exemplary embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A mouse having an adjustable size comprising:
a mouse body having a first side, and a second side, and a back side, wherein the first side and the second side are diametrically opposed sides of the mouse body, and a first plurality of indents are formed in the first side and a second plurality of indents are formed in the second side, and wherein an indent is formed in a center portion of the back side; and
a palm rest coupled to the mouse body, wherein the palm rest has a first size and the palm rest is configured to be removed from the mouse body to fit another palm rest to the mouse body having a second size that is different from the first size; wherein:
the palm rest includes a first arm, a second arm, and a body portion that couples the first arm and the second arm,
the first arm includes a first hinge pin and a first pin device formed thereon, and the second arm includes a second hinge pin and a second pin device formed thereon,
the first arm and the second arm are respectively rotationally coupled to the first side and second side of the mouse body by the first and the second hinge pins, and
the first pin and the second pin are respectively configured to be positioned in the first plurality of indents and the second plurality of indents to tilt the body portion of the palm rest up or down with respect to the mouse body, and
the body portion includes a retractable clip at a center portion of the body portion, which is configured to engage and disengage the indent in the back side of the mouse body, wherein the first hinge pin is disposed between the first pin and the retractable clip, and the second hinge pin is disposed between the second pin and the retractable clip.

2. The mouse of claim 1 wherein the palm rest has a different width than a width of the other palm rest.

3. The mouse of claim 1 wherein the palm rest has a different length than a length of the other palm rest.

4. The mouse of claim 1 wherein the palm rest has a different height than a height of the other palm rest.

5. The mouse of claim 1 further comprising a weight disk removably coupled to a bottom surface of the mouse body, wherein the weight disk is configured to include a set of removable weights to adjust the balance and weight of the mouse.

6. The mouse of claim 5 wherein the weight disk includes a plurality of weight cavities formed therein and the weight cavities are configured to receive the set of removable weights.

7. The mouse of claim 1 wherein the palm rest is coupled to the mouse body such that a gap is formed between the palm rest and the mouse body and the gap is configured as a vent.

8. The mouse of claim 7 wherein the mouse body includes a fan device configured to circulate air in the gap.

9. A mouse having an adjustable size comprising:
a mouse body having a first side, and a second side, and a back side, wherein the first side and the second side are diametrically opposed sides of the mouse body, and a first plurality of indents are formed in the first side and a second plurality of indents are formed in the second side, and wherein an indent is formed in a center portion of the back side; and
a palm rest coupled to the mouse body, wherein the palm rest has a first size and the palm rest is configured to be removed from the mouse body to fit another palm rest to the mouse body having a second size that is different from the first size; wherein:
the palm rest includes a first arm, a second arm, and a body portion that couples the first arm and the second arm,
the first arm includes a first hinge pin and a first pin device formed thereon , and the second arm includes a second hinge pin and a second pin device formed thereon,
the first arm and the second arm are respectively rotationally coupled to the first side and second side of the mouse body by the first and the second hinge pins, and
the first pin and the second pin are respectively configured to be positioned in the first plurality of indents and the second plurality of indents to tilt the body portion of the palm rest up or down with respect to the mouse body, and
the body portion includes a retractable clip at a center portion of the body portion, which is configured to engage and disengage the indent in the back side of the mouse body, wherein the first hinge pin is disposed between the first pin and the retractable clip, and the second hinge pin is disposed between the second pin and the retractable clip, wherein the palm rest has one of a different width, a different length, and different heights from one of the width, the length, and height of the other palm rest.

10. The mouse of claim 9 further comprising a weight disk removably coupled to a bottom surface of the mouse body, wherein the weight disk is configured to include a set of removable weights to adjust the balance and weight of the mouse.

11. The mouse of claim 10 wherein the weight disk includes a plurality of weight cavities formed therein and the weight cavities are configured to receive the set of removable weights.

12. The mouse of claim 10 wherein the palm rest is coupled to the mouse body such that a gap is formed between the palm rest and the mouse body and the gap is configured as a vent.

13. The mouse of claim 12 wherein the mouse body includes a fan device configured to circulate air in the gap.

14. A mouse having an adjustable size comprising:
a mouse body having a first side, and a second side, and a back side, wherein the first side and the second side are diametrically opposed sides of the mouse body, and a first plurality of indents are formed in the first side and a second plurality of indents are formed in the second side, and wherein an indent is formed in a center portion of the back side; and
a palm rest coupled to the mouse body, wherein the palm rest has a first size and the palm rest is configured to be removed from the mouse body to fit another palm rest to the mouse body having a second size that is different from the first size; wherein:
the palm rest includes a first arm, a second arm, and a body portion that couples the first arm and the second arm,
the first arm includes a first hinge pin and a first pin device formed thereon, and the second arm includes a second hinge pin and a second pin device formed thereon, and
the body portion includes a retractable clip at a center portion of the body portion, which is configured to engage and disengage the indent in the back side of the mouse body, wherein the first hinge pin is disposed between the first pin and the retractable clip, and the second hinge pin is disposed between the second pin and the retractable clip.

15. The mouse of claim 14 wherein the first arm and the second arm are respectively rotationally coupled to the first side and second side of the mouse body by the first and the second hinge pins.

16. The mouse of claim 14 wherein the first pin and the second pin are respectively configured to be positioned in the first plurality of indents and the second plurality of indents to tilt the body portion of the palm rest up or down with respect to the mouse body.

17. The mouse of claim 14 further comprising a weight disk removably coupled to a bottom surface of the mouse body, wherein the weight disk is configured to include a set of removable weights to adjust the balance and weight of the mouse.

18. The mouse of claim 17 wherein the weight disk includes a plurality of weight cavities formed therein and the weight cavities are configured to receive the set of removable weights.

19. The mouse of claim 14 wherein the palm rest is coupled to the mouse body such that a gap is formed between the palm rest and the mouse body and the gap is configured as a vent.

20. The mouse of claim 19 wherein the mouse body includes a fan device configured to circulate air in the gap.

* * * * *